(12) United States Patent
Vegh et al.

(10) Patent No.: US 11,887,273 B2
(45) Date of Patent: *Jan. 30, 2024

(54) POST CAPTURE IMAGERY PROCESSING AND DEPLOYMENT SYSTEMS

(71) Applicant: Aerial Sphere, LLC, Phoenix, AZ (US)

(72) Inventors: Dennis J. Vegh, Phoenix, AZ (US); John C. Femiani, Gilbert, AZ (US); Michael Katic, Gilbert, AZ (US); Anshuman Razdan, Phoenix, AZ (US)

(73) Assignee: Aerial Sphere, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,296

(22) Filed: Nov. 21, 2022

(65) Prior Publication Data

US 2023/0090393 A1 Mar. 23, 2023

Related U.S. Application Data

(60) Continuation of application No. 17/034,773, filed on Sep. 28, 2020, now Pat. No. 11,508,030, which is a continuation of application No. 16/673,129, filed on Nov. 4, 2019, now Pat. No. 10,789,673, which is a continuation of application No. 16/182,085, filed on Nov. 6, 2018, now Pat. No. 10,467,726, which is a division of application No. 15/058,958, filed on Mar. 2, 2016, now Pat. No. 10,121,223.

(60) Provisional application No. 62/126,916, filed on Mar. 2, 2015, provisional application No. 62/126,919, filed on Mar. 2, 2015.

(51) Int. Cl.
*G06K 9/00* (2022.01)
*G06T 3/00* (2006.01)
*G06F 16/29* (2019.01)
*G06F 16/50* (2019.01)

(52) U.S. Cl.
CPC ............ *G06T 3/0093* (2013.01); *G06F 16/29* (2019.01); *G06F 16/50* (2019.01); *G06T 3/0068* (2013.01)

(58) Field of Classification Search
CPC ..... G06T 3/0093; G06T 3/0068; G06F 16/29; G06F 16/50
See application file for complete search history.

(56) References Cited

U.S. PATENT DOCUMENTS

| 6,396,961 | B1 | 5/2002 | Wixson et al. | |
|---|---|---|---|---|
| 10,467,726 | B2 * | 11/2019 | Vegh | G06T 3/0093 |
| 10,789,673 | B2 * | 9/2020 | Vegh | G06T 3/0093 |

(Continued)

*Primary Examiner* — Andrew M Moyer
(74) *Attorney, Agent, or Firm* — Schmeiser, Olsen & Watts LLP

(57) ABSTRACT

A post capture imagery processing system is provided. The system is for use with aerial imagery and includes a server having a processor and a memory and a software application providing instruction to the server to process the captured aerial imagery, such as spherical imagery. The server further includes instructions to geo-rectify the spherical imagery. The geo rectifying of the spherical imagery may include one of use of a third party GIS map to associate corresponding data with the spherical imagery in order to produce a geo-referenced spherical image, or calculate the geo-references by a software application performing particular operations on the server.

1 Claim, 10 Drawing Sheets

(56) References Cited

U.S. PATENT DOCUMENTS

| | | | |
|---|---|---|---|
| 11,508,030 B2* | 11/2022 | Vegh | G06T 3/0068 |
| 2001/0038718 A1* | 11/2001 | Kumar | G06T 7/35 |
| | | | 382/284 |
| 2010/0283853 A1* | 11/2010 | Acree | G01C 11/00 |
| | | | 382/293 |
| 2011/0214072 A1* | 9/2011 | Lindemann | G01S 19/14 |
| | | | 709/219 |
| 2013/0004035 A1 | 1/2013 | Chung-Ming et al. | |

* cited by examiner

POST CAPTURE IMAGERY PROCESSING AND DEPLOYMENT SYSTEMS

CROSS REFERENCE TO RELATED APPLICATION[S]

This application is a continuation of U.S. Patent Application entitled "POST CAPTURE IMAGERY PROCESSING AND DEPLOYMENT SYSTEMS," Ser. No. 17/034,773, filed Sep. 28, 2020, which is a continuation of U.S. Patent Application entitled "POST CAPTURE IMAGERY PROCESSING AND DEPLOYMENT SYSTEMS," Ser. No. 16/673,129, filed Nov. 4, 2019, now U.S. Pat. No. 10,789,673, issued on Sep. 29, 2020, which is a continuation of U.S. Patent Application entitled, "POST CAPTURE IMAGERY PROCESSING AND DEPLOYMENT SYSTEMS," Ser. No. 16/182,085, filed Nov. 6, 2018, now patented as U.S. Pat. No. 10,467,726, issued on Nov. 5, 2019, which is a divisional of U.S. Patent Application entitled, "POST CAPTURE IMAGERY PROCESSING AND DEPLOYMENT SYSTEMS," Ser. No. 15/058,958, filed Mar. 2, 2016, now patented as U.S. Pat. No. 10,121,223, issued on Nov. 6, 2018, which claims priority to U.S. Provisional Patent Application entitled "INTERFACE FOR DEPLOYMENT OF AERIAL CAPTURED IMAGERY," Ser. No. 62/126,916, filed Mar. 2, 2015, and claims priority to U.S. Provisional Patent Application entitled "POST CAPTURE IMAGERY PROCESSING SYSTEM," Ser. No. 62/126,919, filed Mar. 2, 2015, the disclosures of which are hereby incorporated entirely herein by reference.

BACKGROUND OF THE INVENTION

Technical Field

This invention relates generally to an image processing system and more particularly to a post capture imagery processing system and a deployment interface of aerial captured spherical imagery.

State of the Art

Aerial photography is useful for many different purposes. For example, aerial photography is used for cartography, land-use planning, archaeology, movie production, environmental studies, surveillance, commercial advertising, conveyancing, artistic projects, and many other purposes. The imagery that is captured is often used with a geographic information system ("GIS") to provide additional information.

Various business and entities are utilizing aerial imagery in order to market and provide better service to customers and the like by using GIS maps and the like. However, a system of effectively processing aerial spherical imagery after capture of the aerial imagery is lacking.

There is a lack of an interface of deploying aerial spherical imagery in order to provide a useful image that can be accessed by various industries and people.

Accordingly, there is a need for a post capture imagery processing system and an interface for deployment of aerial spherical imagery.

SUMMARY OF THE INVENTION

The present invention relates to a post capture imagery processing system for aerial spherical imagery. The system produces a spherical image that is geo-referenced or in other words, the system geo-rectifies the spherical imagery. A common thought when saying this is that the sphere is in a known location when it was captured. The system accomplishes this by not only having a known location when capturing the image, but further rectifying the image such that the system associates the latitude and longitude of each pixel in the spherical image.

An embodiment include a post capture imagery processing system for use with aerial spherical imagery, the system comprising: a server comprising a memory, a database stored in the memory, and a processor, wherein the database contains data for a spherical image and data for a reference map; and a computer coupled to the server wherein a user interfaces with the server through the computer, wherein the server is programmed to: automatically create a non-linear warp from a reference geodetic coordinate system to a pan and tilt coordinates in an equirectangular image; display the equirectangular image on a display of the computer; automatically retrieving a georectified location of a point in the equirectanular image in response to receiving a signal from the computer.

To automatically create the non-linear warp the server may be further programmed to automatically perform a registration process, wherein registration process is a manual registration process using a thin plate spline warping process or wherein the registration process is an automated registration process.

To automatically create the non-linear warp, the server is further programmed to convert a non-warped geographic map to a WGS84 Geodedic coordinate system; to convert from the WGS84 Geodedic coordinate system to Earth-Centered-Earth-Fixed coordinate system; to convert from the Earth-Centered-Earth-Fixed coordinate system to an East-North-Up local coordinate system; and to convert from the East-North-Up local coordinate system to a spherical image, wherein the conversion georectifies the spherical image.

Another embodiment includes a method of using a post capture imagery processing system to georectify an aerial spherical image, the method comprising: storing data for a spherical image and data for a reference map in a database of a server comprising a memory and a processor, wherein the database is stored in the memory; coupling the server to a computer, wherein a user interfaces with the server through the computer; automatically creating at the server a non-linear warp from a reference geodetic coordinate system to a pan and tilt coordinates in an equirectangular image; display at the computer from the server the equirectangular image; and automatically retrieving a georectified location of a point in the equirectanular image by the server in response to receiving a signal from the computer.

The method may further comprise performing a registration process at the server, wherein performing the registration process comprises performing a manual registration process using a thin plate spline warping process, or wherein performing the registration process comprises performing an automated registration process.

The method, wherein automatically creating the non-linear warp further comprises converting a non-warped geographic map to a WGS84 Geodedic coordinate system at the server; converting from the WGS84 Geodedic coordinate system to Earth-Centered-Earth-Fixed coordinate system at the server; converting from the Earth-Centered-Earth-Fixed coordinate system to an East-North-Up local coordinate system at the server; and converting from the East-North-Up local coordinate system to a spherical image at the server, wherein the conversion georectifies the spherical image.

Yet another embodiment includes a system providing deployment interface for utilizing georectified aerial spherical imagery, the system comprising: a server comprising a memory, a database stored in the memory, and a processor, wherein the database contains data for a georectified spherical image and data for a reference map; and a computer coupled to the server wherein a user interfaces with the server through the computer, wherein the server is programmed to: automatically send data for a georectified spherical image from the server to the computer to display of the computer the georectified spherical image; receive a signal from the computer at the server in response to the user selecting a point in the georectified spherical image using the computer; automatically perform a reverse warp process to determine a true geo location of the selected point; and automatically displaying at the computer using the deployment interface the true geo location of the point on a reference map in response to the server sending data of the reference map and the true geo location of the point to the computer.

To automatically perform a reverse warp, the server is further programmed to create a vector by connecting a center of the georectified spherical image with the point, wherein the vector is represented in the East-North-Up coordinate system; to transform the selected point to Earth-Centered-Earth-Fixed coordinate system; to use the vector and project it with a WGS84 ellipsoid representing earth to obtain the spherical image point; to convert from the East-North-Up local coordinate system to a spherical image, wherein the conversion georectifies the spherical image; to convert from the spherical image to the East-North-Up local coordinate system; to convert from the East-North-Up local coordinate system to the Earth-Centered-Earth-Fixed coordinate system; to convert from the Earth-Centered-Earth-Fixed coordinate system to the WGS84 Geodedic coordinate system to; and to convert the WGS84 Geodedic coordinate system to a non-warped geographic map.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
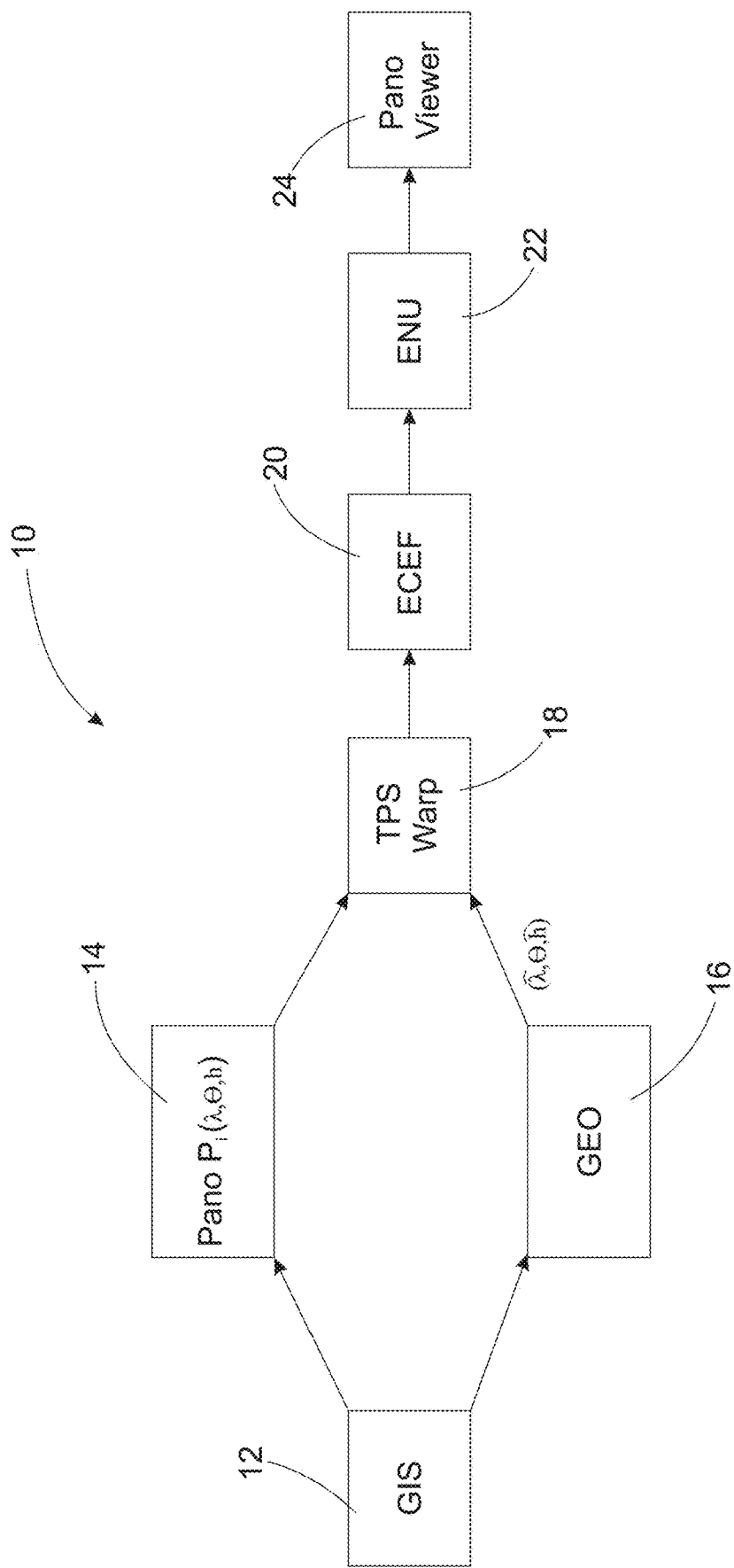
FIG. 1 is a flow chart depicting a method of forward warping in accordance with embodiments of the invention.

As discussed above, embodiments of the present invention relate to a post capture imagery processing system for aerial imagery. The system produces a spherical image that is geo-referenced or in other words, the system geo-rectifies the spherical imagery. Embodiments also relate to a deployment interface of aerial captured imagery.

Spherical imagery may be uploaded to a post capture imagery processing system by storing the spherical imagery on a server having a processor and a memory and a software application providing instruction to the server to process aerial imagery, such as spherical imagery. The system may include a computer having a processor and a memory coupled to the server, wherein a user can access the server through the computer in order to process the imagery. The processing of the imagery may include processing it in two different ways. Further, according to an embodiment of the invention, an interface for deployment of aerial captured imagery includes a server having a processor and a memory and a software application providing instruction to the server to display spherical imagery, to a user on computer coupled to the server, such as through a network connection, such as through the Internet. The interface may include the use a lookup table using spherical bilinear interpolation to go from geodetic position to panorama coordinates directly, and uses another lookup table to transform panorama coordinate to the approximate closest geodetic position in order to compute on the fly the GIS information associated with a selected or viewed portion of the image.

The interface may be deployed from a server having a processor and a memory and a software application providing instruction to the server to display aerial imagery, such as spherical imagery, to a user through a network connection, such as through the Internet. For example the system may provide the map as a website to the user that is displayed on a remote computing device accessible by the user in order to view the spherical imagery.

The post capture imagery processing system operates to create a nonlinear warp from a reference geodetic (latitude, longitude) coordinate system to the pan and tilt coordinates in an equirectangular image. The post capture imagery processing system also operates to perform inverse transformation from (pan, tilt) of an equirectangular image to the reference geodetic coordinate system. This is complicated by the fact that there are nonlinear distortions between the observed locations of features in the panorama and the reference image. These distortions may be caused by several factors, including, but not limited to the panorama stitching process in which several partially overlapping photographs are superimposed and warped into a 360 degree by 180 degree equirectangular image. Other sources of inaccuracy include errors in the recorded image geo-position information, tipping or tilting of the cameras, barrel distortion, or relief displacement from variations in elevations of features on the ground that causes elevated features to appear to lean away from the camera.

The post capture imagery processing system allows a user to visualize the correspondence between reference map features and a panorama image, and then to edit a nonlinear warping function by placing matched pairs of points on the reference map and the panorama. The post capture imagery processing system works in conjunction with the deployment interface, which is a web based application for displaying addresses/locations searched using a third party program, such as, but not limited to Google Places API, and utilizes the mapping from pan and tilt coordinates to accurately mark the location of features in the spherical image.

There are many variables that come into play that complicate the projection from geodetic coordinates to the pan-tilt coordinates of an equirectangular image. First, the reference map images are in a geodetic coordinate system and the post capture image is a spherical image centered at a camera's position and with a pole directly below the camera. Because of this, the projections and going between the geodetic coordinates and the pan-tilt coordinates is not a linear transformation, but a non-linear transformation.

In linear projections, lines are mapped to lines which is not the case when transforming geometry between a spherical image to comparably flat image and vice versa. The post capture imagery processing system operates to map straight lines in flat images to curves or warped lines in the spherical image and vice versa.

Areas around poles, like that of the Earth, create special situations that have given mathematicians headaches for a long time. The problem is called a singularity wherein all meridians collapse to a point so the area near the pole becomes computationally unstable creating "jumps" i.e. when moving a small epsilon on the sphere creates a long jump in a flat image. In forming equirectangular images, the images are taken with the camera pointing down at earth while shooting the images. The point at nadir i.e. directly below the camera, is our local "pole" point on the sphere. That is why there is huge distortion near the bottom third of an equirectangular image. Accordingly, there is a pole issue and hence singularity/instability when approaching the area directly below the camera or when you view the image on a display interface at the center of the spherical image. Embodiments of the present invention address these tricky issues.

Points in a spherical image do not represent true geographic locations due to errors that exist. Because of this, there is a need to create a warp model that mathematically take points in a spherical image and represent them as close as possible to true geo points. As shown in FIG. 1, the system include a GIS feature 12, for example, and without limitation, a house, a building, and the like, represented by Pano point Pi 14 in the spherical image and Geo point Gi 16 in a true georectified map. Each point Pi, Gi is a collection of lambda, theta and h—representing latitude, longitude and height respectively. In a 2D system h=0, but when using DEM in 3D systems h is non-zero. In order to georectify the spherical image, it must go through a registration process, wherein the registration process may be manual or automated.

A manual registration process may be accomplished using Thin Plate Spline ("TPS") warping 18. Data in the form of a collection of 'N' points P1 . . . Pn and corresponding georectified points G1 . . . Gn is gathered, where N depends on distortion and errors in the spherical image. A user of the system may then rely on his/her skill and knowledge to pick N such points and manually register the points. The system provides a user interface that interactively prompts and displays information to the user in order to guide the user through the manual registration process.

An auto registration process of the spherical image may also be provided by the system. The result of the registration process is referred to as a Warp Wf (forward warp) that converts any point in the spherical image to a point $\hat{P}_j$ in ECEF 20. These points are then converted to an ENU coordinate system 22 used by the deployment interface 24.

Figure 2A:
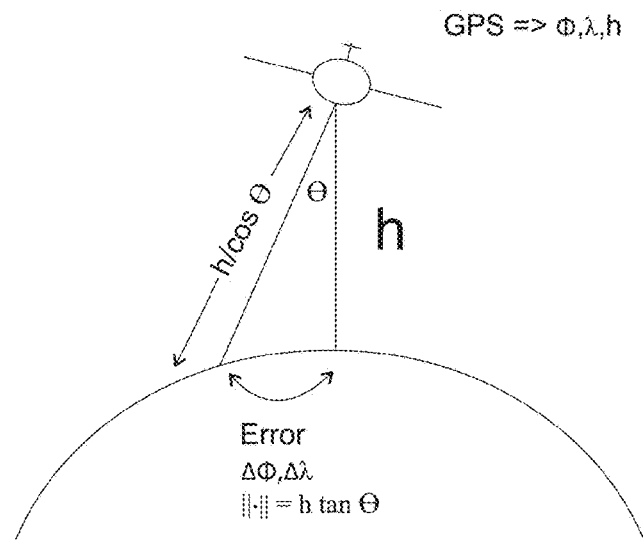
FIG. 2a is diagrammatic view of error caused during capture of an aerial spherical image, in accordance with embodiments of the invention.
Figure 2B:
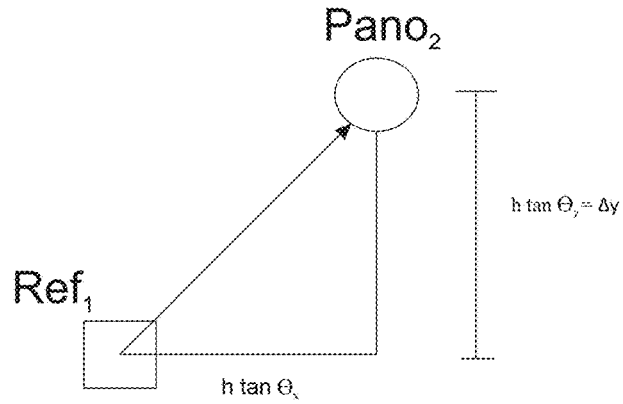
FIG. 2b is a diagrammatic view of utilizing a first point for error correction.
Figure 2C:
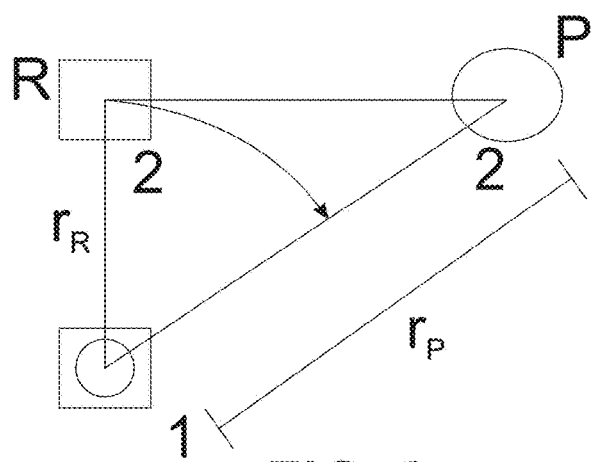
FIG. 2c is a diagrammatic view of utilizing a second point for error correction, in accordance with embodiments of the invention.

A plane that is utilized for obtaining the images used to form the spherical image has a GPS system which is accurate for at least the X, Y position of the plane. In some planes the altitude (Z position) has error. However, the major error is due to the plane being buffeted around while flying as well as the tilt, pitch and yaw caused rotational errors. An error of just a few degrees at the plane level can result in a large error for a point on earth from its true location. Referring to FIGS. 2a-2c, the error is represented.

FIG. 2a depicts the pitch or tilt error. In addition to this there may be a yaw error associated with the plane. The position of the plane is represented as GPS=$\phi$, $\lambda$, h, wherein $\phi$=GPS latitude, $\lambda$=GPS longitude, and h=GPS altitude. The system automatically performs the following calculations and with reference to FIGS. 2b-2c in order to correct the error:

X1R, Y1R=longitude, latitude on a reference map/image for a first point

X1P, Y1P=longitude, latitude on a spherical image for a first point

X2R, Y2R=longitude, latitude on a reference map/image for a second point

X2P, Y2P=longitude, latitude on a spherical image for a second point h'=GPS altitude, adjusted $\theta z$, $\theta x$, $\theta y$=yaw, tilt, pitch $$\Delta Y1 = Y1R - Y1P$$

$$\Delta Y1 = Y1R - Y1P$$

$$\Delta Y2 = Y2R - Y2P$$

$$\Delta X2 = X2R - X2P$$

$$rR = \sqrt{(X2R-X1R)^2 + (Y2R-Y1R)^2}$$

$$rP = \sqrt{(X2P-X1P)^2 + (Y2P-Y1P)^2}$$

Calculations for first point $$\left. \begin{array}{l} \Delta Y1 = h \tan \theta y \\ \Delta Y1/h = \tan \theta y \\ \operatorname{atan}(\Delta Y1/h) = \theta y \end{array} \right\} \text{ if } h = h'$$

Calculations for second point $$s = rR/rP$$

$$h' = hs$$

$\theta z = a \tan[(sY2P-sY1P-Y2R+Y1R)/(sX2P-sX1P-X2R+X1R)]$ $\theta y = a \tan[(sY1P-Y1R)/h']$ $\theta x = a \tan[(sX1P-X1R)/h']$ There are two steps in the process for auto registration. These steps include 1) finding matching reference points automatically, and 2) correcting for GPS errors.

When finding matching reference points automatically, there are one of many algorithms available to perform this function and the system may utilize any algorithm that accurately matched reference points automatically.

Correcting for GPS errors includes the system operating the software application in order to automatically perform the error correction using the equations described above and with reference to FIGS. 2a-2c. This step requires two known points (including height if available using DEM). Using the first point, the system is able to determine the tilt and pitch alignments. Using the second matching point a complete solution can be derived including the discrepancy in yaw and altitude. In some embodiments, additional points may be used to validate and/or correct for the solution obtained using two points.

Embodiments of the present invention include the system operating to convert non-warped geographic mapping to spherical mapping. This process requires multiple steps and conversion processes.

A first step is to convert the non-warped geographic map to the WGS84 Geodedic coordinate system. The WGS84 Geodedic coordinate system represents map positions as latitude, longitude and altitude. A non-warped geographic map uses an image pyramid to represent a Mercator projection of the earth. The coarsest resolution image is in a 256 by 256 square map image and it corresponds to a pyramid level zero or zoom level zero. Each successive zoom level doubles the size of the non-warped geographic map image, so at level one the equator is 512 pixels wide and at zoom level 17 the equator is more than 33.5 million pixels wide.

The second step is to convert from the WGS84 Geodetic coordinate system to the Earth-Centered-Earth-Fixed ("ECEF") coordinate system. As stated previously, the WGS84 Geodetic coordinate system represents map positions as latitude, longitude, and altitude. Since it is a geodetic coordinate system it represents the altitude in meters measured perpendicular to the surface of an oblique spheroid model of the Earth rather than measuring altitude from the center of the Earth. Of course the earth is not an exact spheroid and different approximations for the shape of the Earth have been proposed; however, the WGS84 standard represents a cross-section of the Earth as an ellipse with a minor axis aligned to the poles. The parameters of the ellipse are the length of the major axis A=6378137.0 meters and the length of the minor axis B=6356752.3142 meters.

The ECEF coordinate system is a Cartesian coordinate system with units as meters, and an origin at the center of the earth and axes aligned with the North Pole, the prime meridian, and a third axis perpendicular to the first two. Because ECEF is a Cartesian system we can use it to measure distances and angles. The ECEF coordinates system is used as "World" coordinates. The following calculations may be performed by the system in order to convert from WGS84 to ECEF:

WGS84_A=6378137.0 #meters, radius of the earth
WGS84_E=8.1819190842622e-2 #eccentricity of the spheroid

```
def geo_to_ecef(geo_position):
    lat, lon, alt=geo_position
    a=WGS84_A
    e=WGS84_E
    #Calculation
    lat=radians(lat)
    lon=radians(lon)
```

$n = a/\sqrt{(1.0-e^{**}2^{*}\sin(lat)^{**}2)}$ $x = (n+alt)^{*}\cos(lat)^{*}\cos(lon)$ $y = (n+alt)^{*}\cos(lat)^{*}\sin(lon)$ $z = (n^{*}(1-e^{**}2)+alt)^{*}\sin(lat)$ return x, y, z The third step is to convert from ECEF coordinate system to East-North-Up ("ENU") local coordinate system. The ECEF coordinate system is earth-fixed and there is no clear notion of the local cardinal directions (North, East, Up), which people on the surface of the Earth use to orient ourselves. For example spherical images are likely to be taken so the East is zero degrees of pan, and North is 90 degrees of pan, and West is 180 degrees of pan angle. However these are local directions; depending on where you are in space, meaning that North may be a different direction.

The ENU local coordinate system represents frame of reference with an arbitrary origin (e.g. the camera position) and with axes aligned to the local East, North, and Up directions. In the ENU system, the x-axis (East) is tangent to the gradient of ECEF with respect to longitude, the y-axis is the gradient of ECEF with respect to latitude, and the z-axis is normal to the WGS84 ellipsoid. Again the units are in meters, and the reference system allows you to transform ECEF coordinates into local coordinates relative to the cameras position. The following calculations may be performed by the system in order to convert from ECEF to ENU:

```
def create_enu_matrix(geopos):
    lat, lon, alt=geopos
    c0=cos(radians(lon)); s0=sin(radians(lon))
    c1=cos(radians(lat)); s1=sin(radians(lat))
    x, y, z=geo_to_ecef((lat, lon, alt))
    #Set the locale ENU orientation matrix.
    matrix=[[-s0, c0, 0, 0],
        [-c0*s1, -s0*s1, c1, 0],
        [c0*c1, s0*c1, s1, 0],
        [0, 0, 0, 1]]
    matrix=np.array(matrix, dtype=np.float64)
    #Translate to the cameras position
    matrix[:-1, 3]=-matrix.dot((x, y, z, 1.))[:-1]
    return matrix
```

The fourth step is to convert the ENU local coordinate system to a spherical image to georectify the spherical image. The process to convert a given geodetic location (lat, lon, alt) to a point on the spherical image is to first transform it to ECEF coordinates, and then left multiply the ENU matrix to generate points in a coordinate system centered at the camera. Then spherical coordinates of the point are:

$d = \sqrt{(x^2+y^2+z^2)}$ $pan = (panOffset+180+[\tan]^{-1}(-1)y/x)\%360$ $tilt = -[(tiltOffset+[\cos]^{-1}(-1)z/d)\%180]+90$ where panOffset and tiltOffset are corrections to the camera orientation that can be set through the ASPHERE editor.

In a manual registration process, the system uses Thin Plate Spline ("TPS") Warping. The actual warping is done to WGS84 geodetic coordinates using a thin plate spline. A thin plate spline does scattered data interpolation while minimizing the overall distortion (warping energy) of a two dimensional image. The warping happens when the first three points are selected/matched in the two images.

While it is shown and described to TPS, the system may use any other spline or mathematical model to perform the functions of TPS. However, the other spline or mathematical model must have a way to create a true or close enough inverse so forward and reverse warps can be executed.

Figure 3:
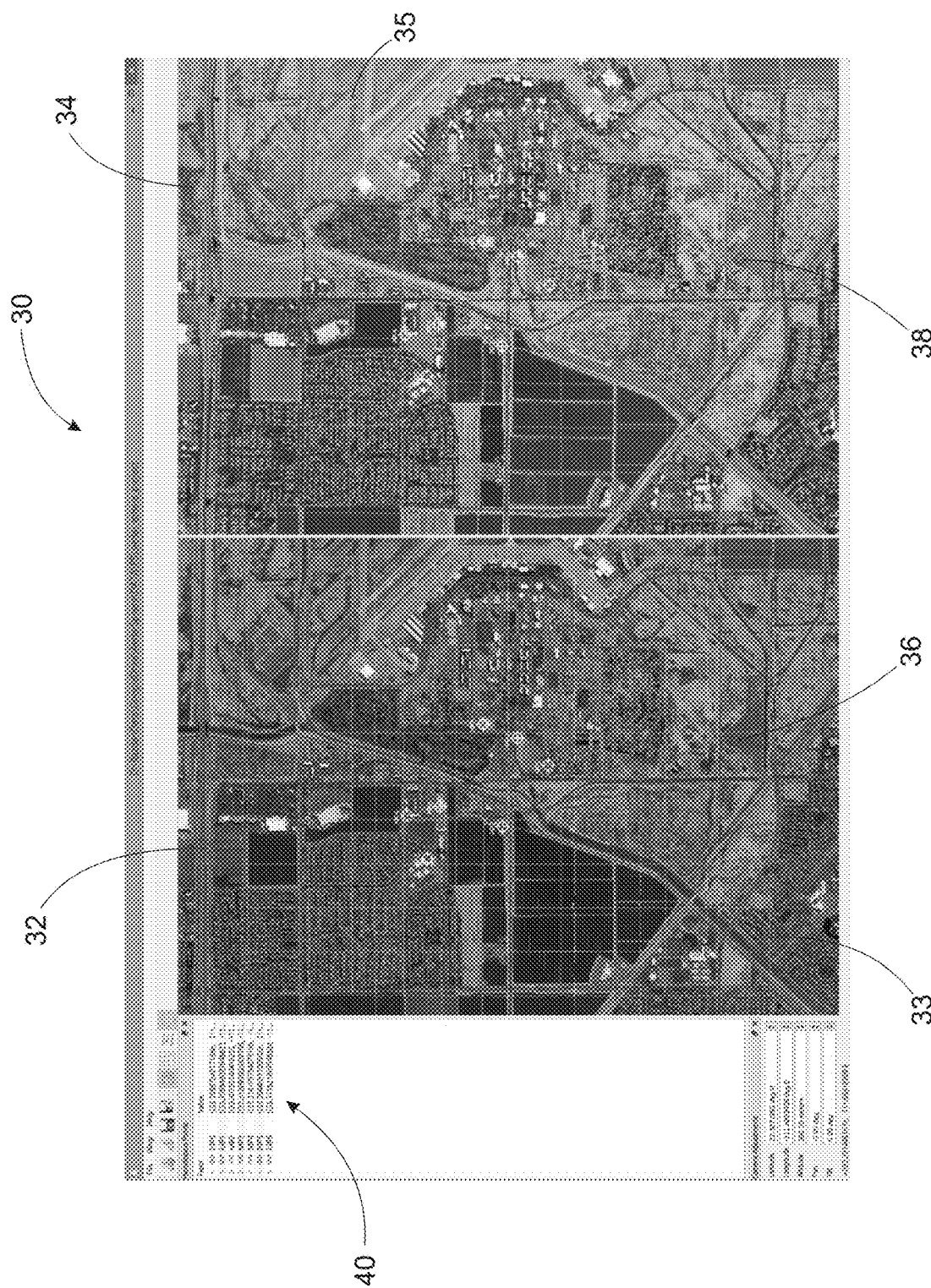
FIG. 3 is a view of a screen of the system utilized for georectifying a spherical image, in accordance with embodiments of the invention.

Using TPS Warping, the system must first focus on a region of interest. Before selecting any points for warping, the system, operating the application displays a grid that is viewable on both images, as shown in FIG. 3, wherein the reference map 32 with grid 33 is displayed next to the spherical image 34 with grid 35. The display of the grid does three things.

First, it helps ensure accuracy within a certain distance. The distance or span the grid encompasses is settable (ex: 2 miles from the center of the spherical image 34), as shown in FIG. 3. The center of the grid 35 is the center of the spherical image 34. This guides the user to select points within the grid 35 and this ensures the resulting warp will at least be accurate within the region of interest (or grids 333 and 35).

Second, as points are picked and the warping algorithm takes effect, the user can see the grid getting warped as well. This gives a visual feedback to the user as to how much warp is needed for a particular image. If the grid warps a lot, the user should pick many more points to stabilize the warp. Stabilizing the warp means adding more points will not change the shape of the grid any more.

Third, at the initialization phase the grid acts as a guide to select initial altitude, pan, etc. values to align the images before the warping process begins.

Each spherical image will carry this region of interest and therefore any application on the other end that wishes to utilize the warp will have some assurance as to the region of interest/accuracy for that spherical image. This is useful in several situations. For example, and without limitation, a dense set of spherical images with overlapping coverage. As the user is looking at one spherical image, he may want to pick a point that is way outside of the region of interest. The system may operate to find out what the closest adjacent spherical image is w.r.t. the current spherical image and if that point falls in its region of interest/accuracy and fetch the latitude, longitude and height values not from the current spherical image but an adjacent spherical image.

The system includes a warper tool that allows a user to intake a spherical image 34 and a reference map 32, as shown in FIG. 3. Because the exact nature of errors is unknown, the system may supply the user with tunable parameters such as altitude, tilt, pan and roll to rectify generally the orientation of the spherical image in reference to the reference map image. Latitude and Longitude can also be set. The user may then start to click on a point 36 in reference map 32 and a corresponding point 38 appears in the spherical image 34. It is understood that the opposite can be done, wherein the user clicks on a point 38 in spherical image 34 and a corresponding point 36 appears in the reference map 32. The user then has the capability to move a point 36 or 38 around to fix its location in either of the images. The points 36 and 38 and their lat/lon appear in a column 40 to the left of the images. These are called warp points 40 and become data used to generate the TPS warp (forward). User skill set is needed to accurately represent points and their true location in the reference map. After the first three points are rectified, the system may then begin to approximate the remainder of the points in the spherical image with reference to the reference map.

Figure 4A:
FIG. 4a is a view of a captured spherical image, in accordance with embodiments of the invention.

The system may also be used to blend the sky in order to produce the spherical image. The original spherical image shot by a camera system may capture part of the wings, wheels and other parts of the aircraft which occlude the sky portion of the spherical image as shown in FIG. 4a. The presence of these aircraft parts constitutes a visual disruption. The warper tool provides a way of blending an equirectangular image of an unoccluded sky captured at a different time but visually similar to the original spherical image, i.e., time of day, cloud patterns, atmospheric haze, etc.

This can be accomplished using two possible methods to composite/blend the sky image onto the original spherical image. One method is a manual method and the other is an automated method.

Figure 4B:
FIG. 4b is a view of a matching sky image aligned with the spherical image, in accordance with embodiments of the invention.
Figure 4C:
FIG. 4c is a view depicting a blended matching sky image with the spherical image, in accordance with embodiments of the invention.

With the manual method, the user is given control over roll, tilt, and pan to as closely align the image as possible visually. Based on these inputs system operates the warper tool to warp the sky to match the orientation of the original spherical image as shown in FIG. 4b. Then the user is given control over the amount and location of blending of the sky image onto the original spherical image as shown in FIG. 4c. In other words, the user can define the horizontal position (tilt angle) and the amount, in pixels, of fade (alpha channel dithering). The result is a composite equirectangular image of the sky and original spherical image.

With the automated method, the warper tool would automatically analyze the sky in the original spherical image shown in FIG. 4a to determine the cloud patterns and atmospheric haze. The system would also automatically read the time of day the original spherical image was collected. The system would then automatically search a library of skies collected from various times of day with various atmospheric conditions. The goal of the search is to find a sky in the library that most closely matches the original spherical sky. Once the best match is chosen, the system would automatically read tilt, roll, heading values output from an inertial measurement unit at the time the original spherical image was captured and apply those values to the sky image to properly align the sky image with the original spherical image as shown in FIG. 4b. Finally, the warper tool would automatically apply a blend between the sky and original spherical images and output a composite equirectangular image of the sky and original spherical image as shown in FIG. 4c.

This new spherical image with the blended sky is used to create the cube maps for ingesting by the deployment interface. Cube maps are maps on the faces of a cube (six faces top, bottom, left, right, front and back). A spherical image can be represented by the six faces of a cube. Deployment interfaces use these as inputs to render the spherical image for the end user/viewer. The warper tool then generates the six cube maps very fast.

In some embodiments, the deployment interface allows for reversing the process. The deployment interface may utilize an existing map API. When the deployment interface starts a request is made to the API for map data. Next the deployment interface then checks to determine if there are any spherical images.

The spherical images are then all added as places via the existing map API. At this point a click event is linked to each point that opens up the respective deployment interface.

Before displaying the spherical image view, all of the currently plotted places on the existing map are scanned and converted from geodetic position to a panoramic position utilizing the system as previously discussed. Once the panoramic position has been obtained the system provides it to the deployment interface. The deployment interface may be configured by an XML file that is also stored on the server and is also accessed via a single request per spherical image. This configuration files stores deployment interface hotspots that are to be displayed in the panorama or spherical view. To display places, objects and the like the system operates after the configuration file has been read and obtains the information, and may use either a DOMParser or a new ActiveXObject. These interfaces then allow the system to execute the read xml and edit any elements and attributes. The system then adds a hotspot element with pan and tilt attributes for each place. Finally, the deployment interface opens the spherical image ins a viewer and lets the viewer take control of the image.

The deployment interface may include three components: a map viewer; a panorama viewer; and an interface which processes data retrieved from multiple sources so that it is consistent with one another.

The map viewer is used to display top down data visualization in the existing maps API. All the data displayed here trusts the trueness of the existing maps satellite imagery projections. This means that data sent to this interface doesn't require any preprocessing. The deployment interface can interface with any map service held on a map server, wherein the map server may be a third party map server.

The panorama viewer may be interfaced through JavaScript calls or the like to add and/or remove data, adjust display parameters, etc. Once data has been prepared it is passed to the panorama viewer for display. An important aspect of embodiments of the present invention is that data can be fed to the panorama viewer.

Preparing data may be done on demand as requested by various features exposed to the user. The two types of requested data that need to be made consistent, i.e. mapped in same geolocated projection, are spherical imagery and data markers. The geo projections need to be adjusted because there can be inconsistency in photographed spherical imagery. To solve this issue, the data markers are converted to match the inconsistencies of the panoramic imagery. The reason the imagery isn't adjusted is that it would cause skewing that would be visible to a front end user.

The user may make requests to a centralized server, such as, but not limited to sending restful API calls to the centralized server. The request contains a geolocation and a panorama identification number ("PID"). The server then returns a formatted object containing the geolocation represented as a pan tilt pair representing the location of the corresponding data in the panorama associated with the PID. The pan tilt calculated by the server uses the same library used to create the spherical image's associated warp. The system in performing the calculation applies a thin plate spline transform to convert the actual latitude and longitude to a warped projected latitude and longitude. Then a standard conversion from latitude, longitude, and altitude to pan and tilt is applied.

Figure 8:
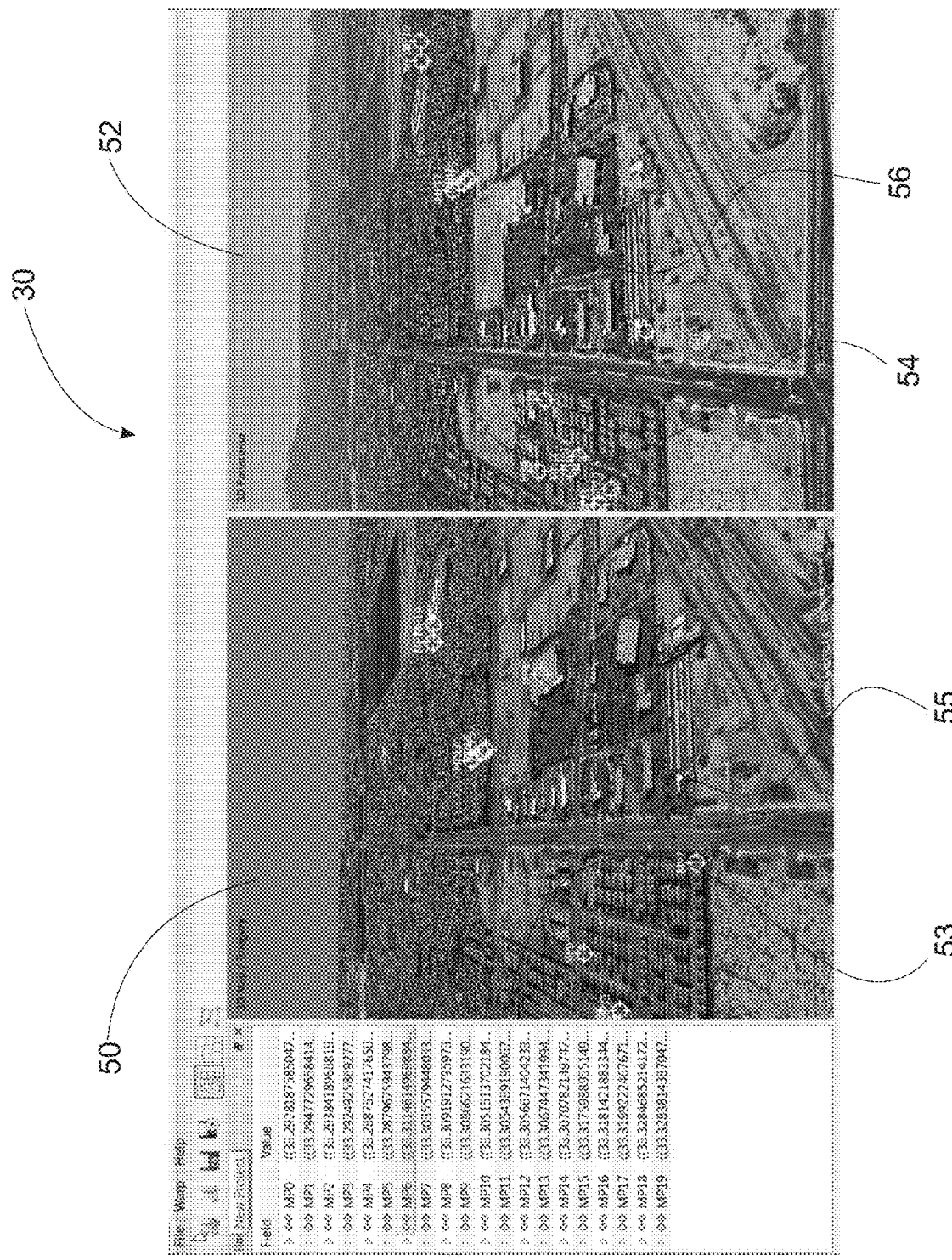
FIG. 8 is view of a deployment interface displaying a georectified spherical image, in accordance with embodiments of the invention.

The system can now utilize the deployment interface to initiate and perform "reverse" warping to get the (approximate) true location of a point clicked in the panorama viewer. The reverse warp allows a user to take a point clicked in the spherical image and find its true geo location as shown in FIG. 8, wherein points 54 and 56 clicked in spherical image 52 of deployment interface is then represented in its true deo location in the reference map 50 as points 53 and 55 respectively. This is accomplished through what may be referred to as an "unwarp" or reverse warp process. Refer to hand drawn FIG. 2 on next page.

Figure 5:
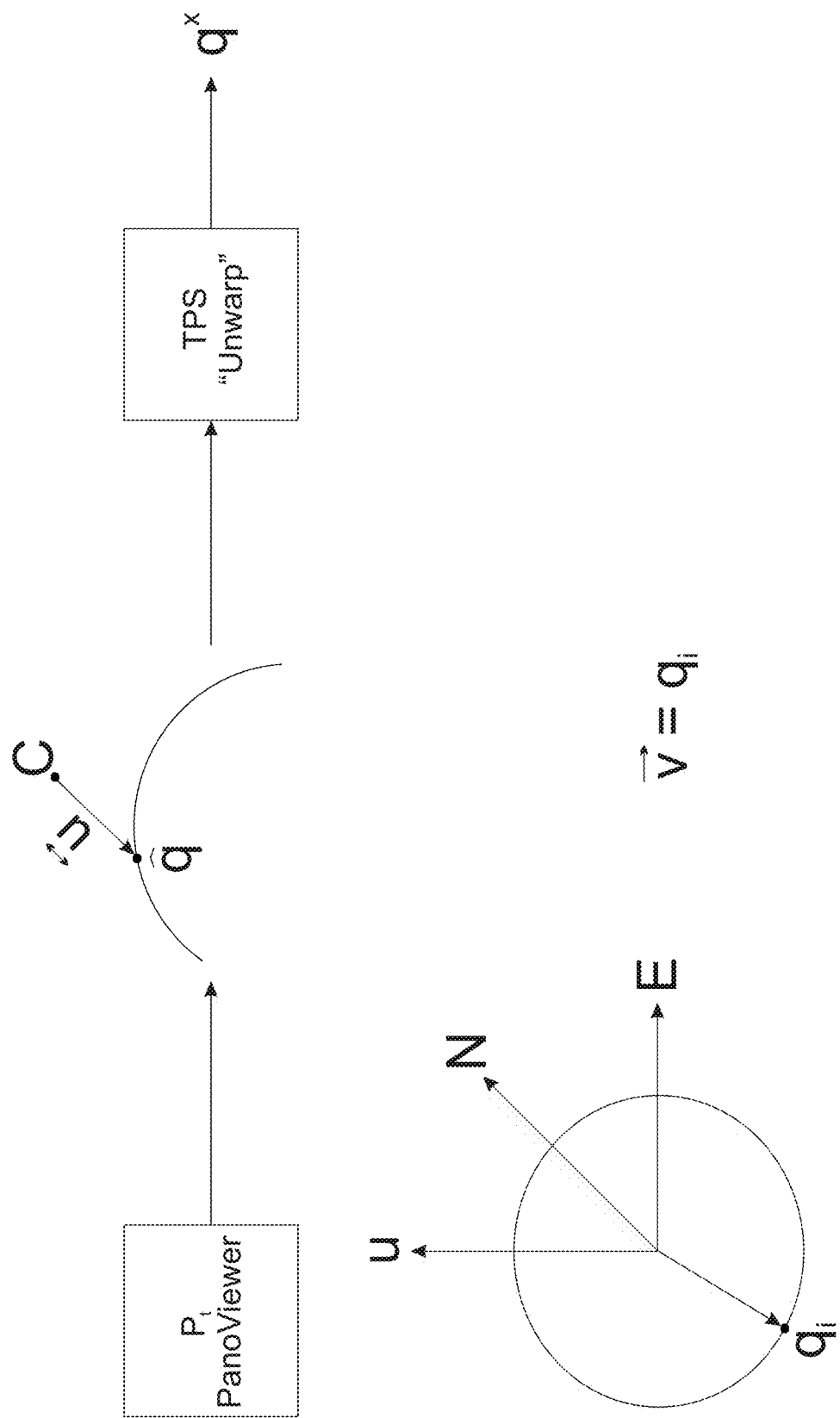
FIG. 5 is a diagrammatic view of a reverse warp process, in accordance with embodiments of the invention.

As shown in FIG. 5, for a point $q_i$ (x, y, z) located in the spherical image the system needs to find its true geolocation. The point C (camera position or center of the sphere) is a known point. The system creates a vector V (C, $q_i$) by connecting the center with $q_i$. This point is represented in the ENU coordinate system. Next the system needs to transform this point $q_i$ into the ECEF system i.e. project it on "earth". The system then uses the vector and projects or intersects it with the WGS84 ellipsoid representing earth. The projected point $q_i$-hat has lat, lon and height (height=0 for 2D and Non Zero where DEM or 3D is used). This point represents the spherical image point (with error) projected on the earth's surface (ECEF). The system now needs to "reverse warp" to get the point's true location in the sphere (lat, lon, h).

If Wf represents the forward warp and is constructed from points Pi and Gi (Wf=tps [Pi, Gi]) as described previously, then the system can construct another warp called Wr=tps [Gi, Pi]. While Wr is not a true inverse of Wf, it is a very close approximation as its inverse. The system may then apply Wr to point $q_i$-hat to get point pi-hat on the spherical image.

Figure 6:
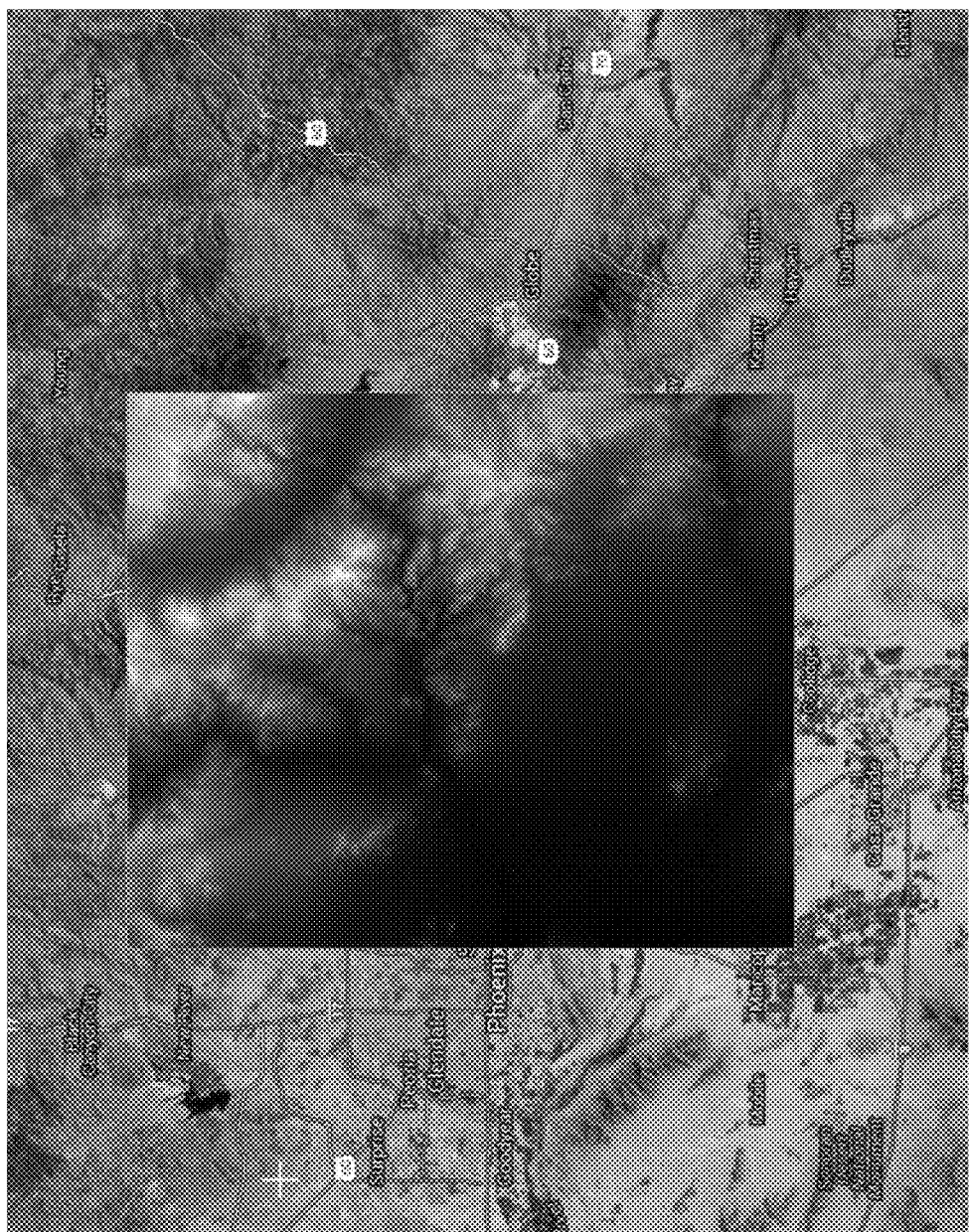
FIG. 6 is view depicting relief displacement, in accordance with embodiments of the invention.

In some embodiments, correcting relief displacement in equirectangular images is necessary. Relief displacement is a result of perspective projection in aerial images which causes elevated objects to appear to lean away from the focal point of the camera. This applies to large features such as hills, mountains, and valleys as well as to fine scale features such as rooftops. In remote sensing applications in which images are the results of optics (rather than the complex warping process used to produce panoramic images). As shown in FIG. 6, depicted is an example of the Shuttle Radar Topography MIssion (SRTM) 1 Arc Second Global DEM data over the Phoenix metropolitan area. This data has a spatial resolution of 30 meters per pixel; brighter colors indicate higher elevation measured geodetically (normal to the surface of the WGS84 spheroid rather than from its center).

Figure 7B:
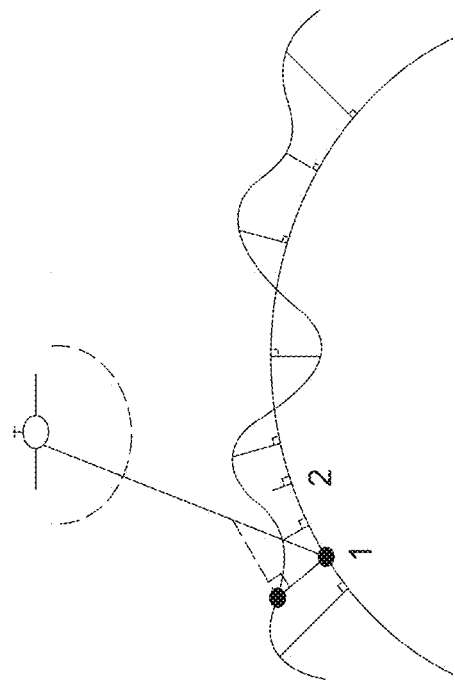
FIGS. 7a-7d are views of an iterative process for correcting relief displacement, in accordance with embodiments of the invention.
Figure 7D:
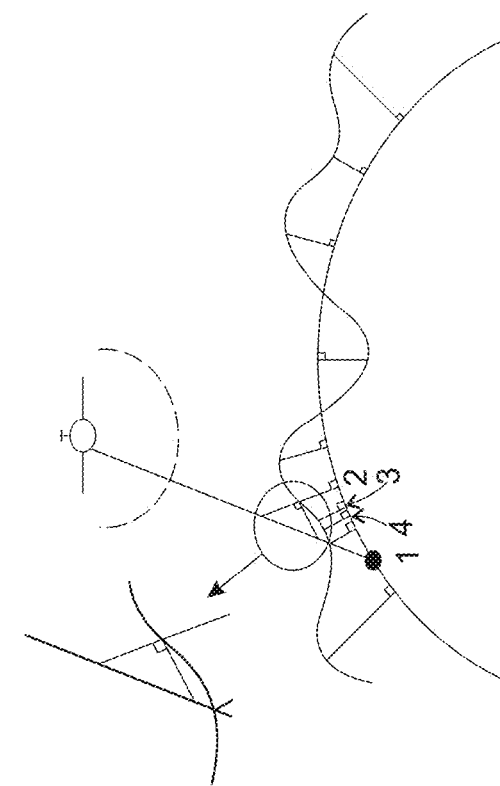
Figure 7A:
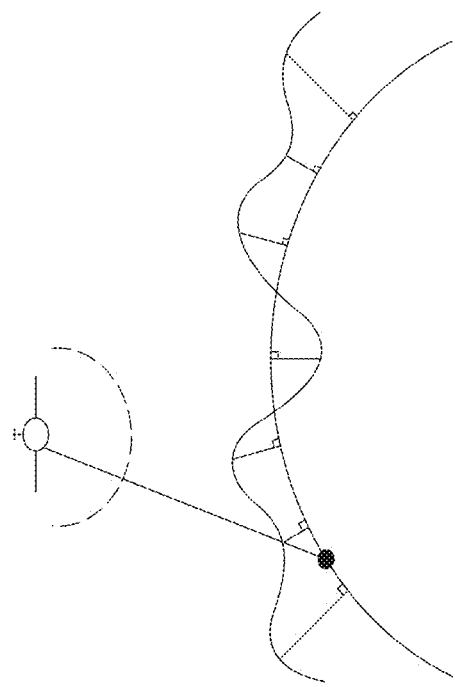
Figure 7C:
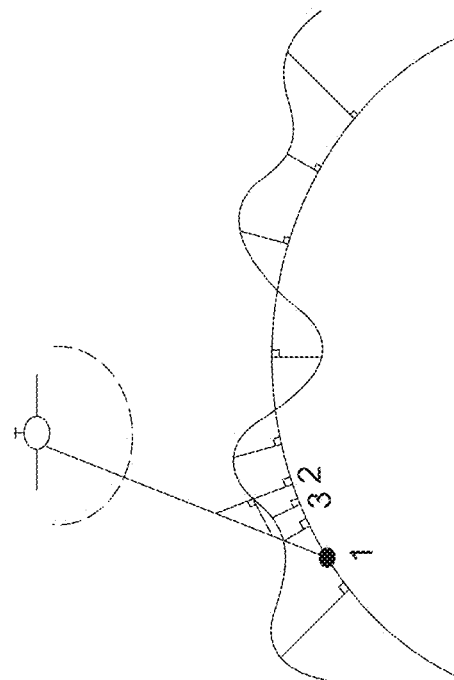

With reference to FIGS. 7a-7d, embodiments of the present invention include an iterative process for correcting relief displacement by estimating the intersection of a ray and the displaced surface of the Earth. In FIG. 7a, (1) A ray is cast from the camera's center (just below the aircraft) out through an imaginary sphere until it intersects the WGS84 spheroid; in FIG. 7b, (2) The elevation at the first point of intersection is fetched from the DEM and a new intersection point is calculate between the ray and a dilated version of the spheroid that is dilated to match the DEM elevation, so that the latitude and longitude coordinates of the second point can be determined by projecting the new intersecting point onto the WGS ellipsoid and fetching the elevation at the new location from a DEM; in FIG. 7c, (3) The process repeats using a spheroid that is dilated to the elevation of the second point; in FIG. 7d, (4) at some point the difference in elevation between the last intersection point and the DEM data falls below a tolerance threshold, or in some embodiments, until the system exceeds a maximum number of allowed iterations.

Another approach, according to embodiments of the present invention would be to do a bisection search along the ray to find the intersection through operation of the system. First, calculate d_max=intersection with the WGS84 ellipsoid. Then fetch the elevation from a DEM and intersect it with the ray. If the elevation at the new point is above the identified point, update d_max and repeat the process. Eventually, the system will identify a point above the ray and can set the d_min to the distance along this ray. The actual intersection between the surface and the ray must lie between d_min and d_max, so we can probe the ray at (d_min+d_max)/2. If the elevation at this middle point is under the ray, the system updates d_max:=(d_min+d_max)/2 and repeats. If this is below the ray, the system updates d_min and repeats. This guaranties that the system cuts the error in half at each step, and will converge quickly.

In fact, in some embodiments, the entire process may be done this way; set d_max to the intersection with a WGS spheroid model of the earth, set d_in to zero, and do a bisection search for the intersection with the DEM.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A method of deploying an interface for utilizing georectified aerial spherical imagery, the method comprising:
   send data for a georectified spherical image from a server to a computer to display on the computer the georectified spherical image, wherein the georectified spherical image is created with a warping process comprising a nonlinear warp from a reference geodetic coordinate system to pan and tilt coordinates in the spherical image;
   receive a signal from the computer at the server in response to the user selecting a point in the georectified spherical image using the computer, wherein the signal includes the location of the point in the georectified spherical image;
   perform a reverse warp process to determine a true geo location of the selected point, wherein the server is further programmed to create a vector by connecting a center of the georectified spherical image with the point; and
   display at the computer using the deployment interface the true geo location of the point on a reference map in response to the server sending data of the reference map and the true geo location of the point to the computer.

\* \* \* \* \*